United States Patent [19]
Palmer et al.

[11] Patent Number: 5,734,736
[45] Date of Patent: Mar. 31, 1998

[54] AUTONOMOUS RENDEZVOUS AND DOCKING SYSTEM AND METHOD THEREFOR

[75] Inventors: Leon G. Palmer, Rancho Palos Verdes; Timothy J. Murphy, Redondo Beach; John A. Morrison; Teresa M. Morrison, both of Rancho Palos Verdes, all of Calif.

[73] Assignee: TRW Inc., Redondo Beach, Calif.

[21] Appl. No.: 261,729

[22] Filed: Jun. 17, 1994

[51] Int. Cl.⁶ .............. G06K 9/00; G06K 9/48; G01S 13/00; G01N 21/86
[52] U.S. Cl. .......... 382/103; 382/197; 382/256; 250/548; 342/64; 244/161
[58] Field of Search .............. 382/161, 256, 382/257, 197, 103, 259; 250/548; 342/64; 244/161; 411/386; 348/117; 340/958; 403/325

[56] References Cited

U.S. PATENT DOCUMENTS

| | | | |
|---|---|---|---|
| 5,103,484 | 4/1992 | Stafford et al. | 382/259 |
| 5,237,621 | 8/1993 | Cox et al. | 382/257 |
| 5,267,328 | 11/1993 | Gouge | 382/197 |
| 5,289,374 | 2/1994 | Doi et al. | 382/256 |
| 5,319,551 | 6/1994 | Sekiguchi et al. | 382/256 |
| 5,334,848 | 8/1994 | Grimm | 250/548 |
| 5,341,142 | 8/1994 | Reis et al. | 342/64 |

OTHER PUBLICATIONS

Boudreaux, Richard, "In Russia Space Program Heroics, Cosmonaut Snares Crucial Supplies", Los Angeles Times, Sep. 2, 1994.

*Primary Examiner*—Leo Boudreau
*Assistant Examiner*—Monica S. Davis
*Attorney, Agent, or Firm*—Robert W. Keller; G. Gregory Schivley

[57] ABSTRACT

Disclosed is an autonomous rendezvous and docking system and method therefor used for the rendezvous and docking of spacecraft. The autonomous rendezvous and docking system allows spacecraft rendezvous, proximity maneuvering, and docking between a chase spacecraft and a target spacecraft by determining the relative position between the two spacecrafts. The relative position is determined based on the location of target reflections from a reflective target positioned on the target spacecraft. The target reflections are identified by intensity, shape, size and location from various other spurious reflections. This ultimately allows the autonomous rendezvous and docking system to determine the x, y, z, roll, pitch and yaw positions of the target spacecraft in relation to the chase spacecraft.

31 Claims, 5 Drawing Sheets

Compute the 6 DOF state vector from the identified image target using a multi-stage estimator

FIG. 9.

Compute tracking search window using estimates from previous frames and system dynamics

FIG. 10.

Blob intersects search window boundary

Enlarge search window along intersected borders by expected blob diameter

Target search window does not contain 3 blobs

Enlarge window based on worst case dynamics

FIG. 11.

AUTONOMOUS RENDEZVOUS AND DOCKING SYSTEM AND METHOD THEREFOR

BACKGROUND OF THE INVENTION

1. Technical Field

This invention relates generally to a rendezvous and docking system and method therefor and, more particularly, to an autonomous rendezvous and docking system for the rendezvous and docking of spacecrafts.

2. Discussion of the Related Art

Today, various spacecrafts require systems which provide for automated and timely relative position updates between two space platforms. In particular, this capability is critical for the success of many maneuvers such as spacecraft rendezvous, proximity maneuvering and docking. Spacecraft rendezvous relates to determining an initial attitude and distance between two spacecraft and to providing information needed to initiate a final automatic docking sequence. Proximity maneuvering or soft-docking refers to a condition where two spacecraft reach and maintain a relative proximity configuration that is substantially equivalent to physically docking the two spacecrafts. Finally, docking is the phase of a space mission in which two spacecrafts are maneuvered to a relative positional configuration where they are safely latched together.

Spacecraft rendezvous, proximity maneuvering and docking arise in most space missions. For example, such maneuvers typically arise with commercial satellites, cargo transfer spacecraft, lunar mission spacecraft and various repair and service spacecrafts. These maneuvers are typically conducted between an active chase spacecraft and a passive target spacecraft. A current approach to achieving these maneuvers is with the use of a manual manned system.

The manual manned system provides a video sensor or camera which produces a visual output that is used exclusively by a pilot to control docking and maneuvering. In other words, a pilot of a chase spacecraft visually observes a target on a target spacecraft from the video output and maneuvers the chase spacecraft into a docking position with the target spacecraft using the chase spacecraft's controls. However one drawback of this system is that in some cases, it is either impossible or impractical to have an individual pilot in the loop to perform these tasks. For example, some space missions are too risky and would endanger a pilot, while other space missions may use unmanned spacecraft which are not designed to support a human payload.

Because of these limitations, automated systems have been developed where video sensor data is gathered to determine the location of a target based only on simple light intensity thresholding of reflected signals back from the target. The video sensor data includes spurious signals induced by variable light conditions and other factors, in addition to reflections from the actual target on the target spacecraft. In order to determine and track the appropriate reflections from the actual target as opposed to spurious signals, the system only determines if the reflected data gathered exceeds a light intensity threshold. This results in numerous signals meeting the threshold which are not from the actual target. Moreover, since the target spacecraft, such as a satellite is typically covered with highly reflective material for thermal considerations, the target spacecraft itself is a major source of spurious signals. Thus, this automated system is not very accurate and as such, performs very poorly.

The manual manned system and the automated system mentioned above will support maneuvers such as spacecraft rendezvous, proximity maneuvering and docking. However, both of these systems have several drawbacks associated with their use which include manual maneuvering, the use of a pilot, low accuracy and poor performance.

What is needed then, is an autonomous rendezvous and docking system and method therefor which does not suffer from the above mentioned drawbacks. Moreover, the autonomous rendezvous and docking system should provide automatic relative position updates, work in variable light conditions, and track the target based on an intensity window, shape, size, location and range. It is, therefore, an object of the present invention to provide such an autonomous rendezvous and docking system and method therefor.

SUMMARY OF THE INVENTION

In accordance with the teachings of the present invention, a method and apparatus for autonomous rendezvous and docking of a chase spacecraft with a target spacecraft is disclosed. This is basically achieved by receiving reflected radiation from a reflective target positioned on the target spacecraft, in addition to other spurious reflected radiation. The reflected radiation is then filtered to determine the actual target reflections from the reflective target. Once the target reflections are identified, the relative state vector (x, y, z, roll, pitch and yaw) between the two spacecraft is calculated from the positions of the target reflections.

In one preferred embodiment, a reflective target responsive to radiation of a first in band wavelength is positioned on a target spacecraft. A sensor system for transmitting and receiving radiation of the first in band wavelength and of a second out of band wavelength illuminates the reflective target. The sensor system then receives and separates the reflected radiation into a first in band image and a second out of band image corresponding to the first in band and second out of band wavelengths. The second out of band image is pointwise unsigned differenced from the first in band image to produce a third difference image which includes target reflective images and spurious reflected images such that each image consists of multiple pixels.

Adjacent pixels are then grouped into candidate target regions. The target regions, which correspond to the reflections from the reflective target are then discriminated positively from spurious regions based on intensity, size, shape and location. Once the target regions have been identified, the state vector components x, y, z, roll, pitch and yaw positions of the reflective target are then determined. Use of the present invention provides a method and apparatus for autonomous rendezvous and docking of a chase spacecraft with a target spacecraft. As a result, the aforementioned disadvantages associated with the current approaches of spacecraft rendezvous, proximity maneuvering and docking, have been substantially eliminated.

BRIEF DESCRIPTION OF THE DRAWINGS

Still other advantages of the present invention will become apparent to those skilled in the art after reading the following specification and by reference to the drawings in which.

DETAILED DESCRIPTION OF THE PREFERRED EMBODIMENT

The following description of the preferred embodiment and method concerning an autonomous rendezvous and docking system is merely exemplary in nature and is in no way intended to limit the invention or its application of uses. Moreover, the present invention is described in detail below with reference to the docking of spacecrafts. However, it would be appreciated by those skilled in the art that the present invention, as defined by the appended claims, is clearly not limited to only the docking of spacecrafts and may be used with other types of vehicles, such as land or water based vehicles.

Figure 1:
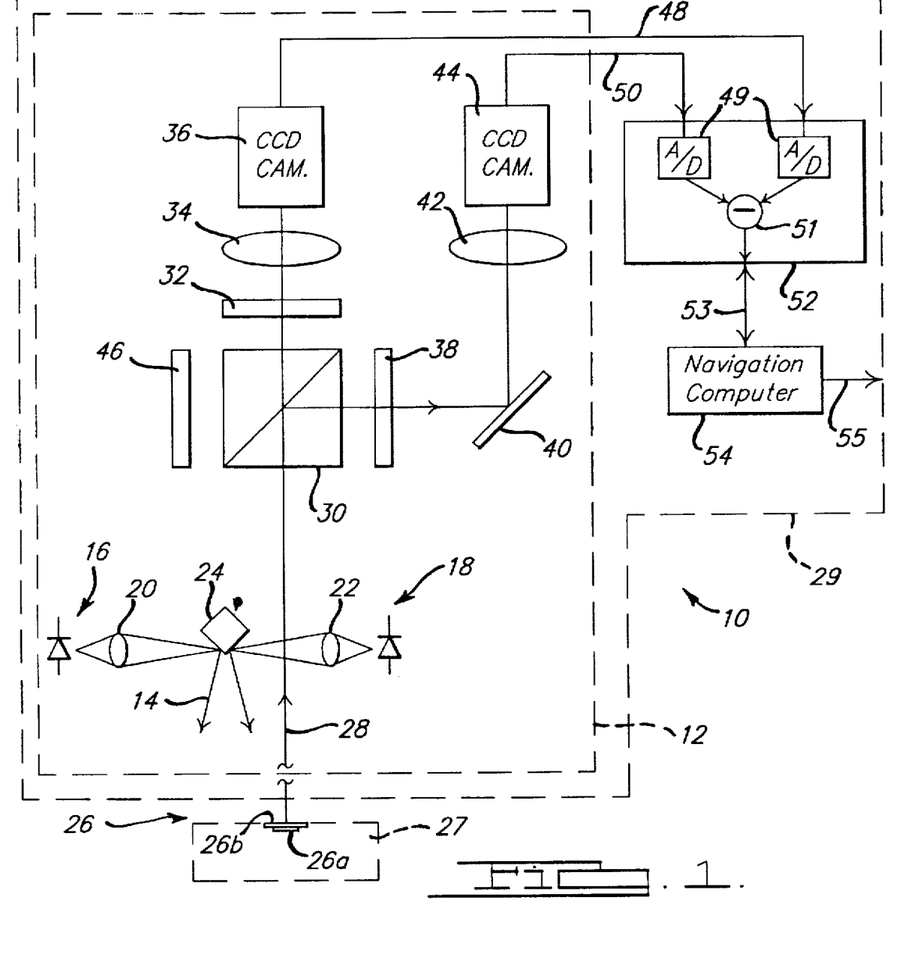
FIG. 1 is a schematic block diagram of one preferred embodiment of the present invention.

Referring to FIG. 1, an improved autonomous rendezvous and docking system 10, is shown. The improved autonomous rendezvous and docking system 10 includes a video guidance sensor system 12, an image processing computer 52 and a navigation computer 54. The sensor system 12, image processing computer 52 and navigation computer 54 reside on a chase spacecraft vehicle, identified generally by the numeral 29. The video guidance sensor system 12 is set forth in detail in Spacecraft Docking Sensor System, filed Apr. 9, 1993, Ser. No. 08/047,127, now U.S. Pat. No. 5,334,848 and is incorporated by reference.

The video guidance sensor system 12 generates an illuminating beam 14 of light from two semiconductor laser diodes 16 and 18. One of the laser diodes preferably has a first in band wavelength of 778 nanometers (nm) and the other has a second out of band wavelength of 820 nm. Light from the laser diodes 16 and 18 are directed through respective lenses 20 and 22 into a cube reflector 24. The cube reflector 24 reflects the laser light along the common path of the illuminating beam 14. Alternatively, light from the laser diodes 16 and 18 may be directed into optical fibers (not shown), which may be positioned in close proximity to each other at the focal point of an appropriate lens, to form the illuminating beam 14.

The illuminating beam 14 impinges on a reflective target 26, which is preferably positioned on a passive target spacecraft, shown diagrammatically by the numeral 27. Other reflective objects or portions of the target spacecraft 27 on which the target 26 is located also reflects light back to the sensor system 12. The target 26 includes a layer of reflective material 26a and an optical filter 26b, that passes only light of approximately 778 nm or the first in band wavelength, where "band" is defined as the pass band of the optical filter 26b. Thus, the target 26 reflects only light having the first in band wavelength of 778 nm. It should be noted that one skilled in the art would readily recognize that other wavelength diodes and filters could also be utilized and that the target 26 could be positioned on a land or water based vehicle.

The reflective light which is indicated by the path 28, first encounters a beam splitter 30. The beam splitter 30 splits the received light into two (2) approximately equal portions. One portion passes straight through the beam splitter 30, through a filter 32 that passes only in band light of 778 nm wavelength, through a lens 34 and into a charge coupled device (CCD) camera 36. Alternatively, other imaging sensors such as charge injection device cameras, vidicon, etc. could also be used. The other portion of the received light is reflected from the beam splitter 30, passes through a second filter 38 that passes only out of band light of 820 nm wavelength, and is then reflected from a mirror 40 through another lens 42, and into a second CCD camera 44. An opaque screen or stop, indicated diagrammatically at 46, ensures that light from other sources is not reflected into the first camera 36 by the beam splitter 30.

The first camera 36 records a first in band image only from light of wavelength 778 nm, that is, light received from every reflective object in the path of the illuminating beam 14, including the target 26. The second camera 44 records a second out of band image only from light of wavelength 820 nm, that is, light received from every reflective object except the target 26. Electrical signals corresponding to the two (2) camera images are transmitted over lines 48 and 50, respectively, to an image processing computer 52. It should be noted that one skilled in the art would recognize that a single CCD camera could also be utilized with two filters to produce the two images.

The image processing computer 52 is preferably a R-3000 computer produced by TRW Inc. The image processing computer 52 performs a pointwise unsigned difference using a table look-up to assign zeros to negative values to produce a third difference image that is substantially free of clutter due to unwanted or spurious reflections. However, due to some spurious reflections and tolerance errors inherent in the system, further processing of the third differenced image is performed in the image processing computer 52 to ensure that only the reflections from the target 26 are acquired and tracked. This target information includes the six-degrees-of-freedom positions (x, y, z, roll, pitch, yaw) which are then passed to a navigation computer 54 which is preferably also part of the same TRW Inc. R-3000 computer. The navigation computer 54 uses this information to command thrusters via output 55 to perform spacecraft rendezvous, proximity maneuvering and docking between the active chase spacecraft 29, where the system 10 is installed and the passive target spacecraft 27, where the target 26 is positioned.

Figure 2:
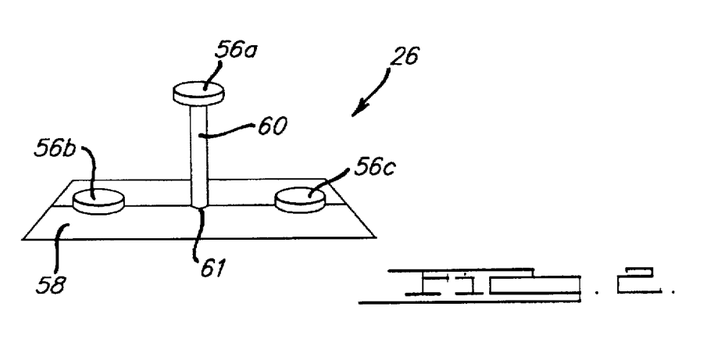
FIG. 2 is a detailed perspective diagram of a target used in the present invention.

Turning to FIG. 2, a more detailed diagram of the target 26 is shown. The target 26 which is positioned on the passive target spacecraft includes three (3) disk shaped circular retroreflectors 56a, 56b and 56c, each having a circular top surface and positioned on a thin substrate forming a cooperative background 58 of a highly lambertian, low specular material. The retroreflectors 56a, 56b and 56c ideally return all the energy/light to its source so that the reflected energy/light is not diffused. Moreover each retroreflector 56a, 56b and 56c comprises the reflective material 26a and the optical filter 26b so that energy/light of a specific in band wavelength is reflected.

A center retroreflector 56a is positioned atop an attitude pin 60, such that the base of the attitude pin 60 is at the midpoint 61 between the centers of two (2) base retroreflectors 56b and 56c. The retroreflectors 56a, 56b and 56c reflect substantially all of the light from the illuminating beam 14 (see FIG. 1) while the cooperative background 58 inhibits reflection of the illuminating beam 14 (see FIG. 1) so that three (3) distinct target reflections will result. The cooperative lambertian background 58 comprises a beta cloth material and serves to preclude the specular noise reflections adjacent the target reflections.

The retroreflectors 56a, 56b and 56c preferably have diameters of 0.52 inches, with the centers of the base retroreflectors 56b and 56c separated by 4.26 inches. The center retroreflector 56a preferably sits 2.13 inches atop the attitude pin 60. The length of the cooperative background 58 is 5.82 inches and the width is 4.16 inches. The maximum dimensions of the cooperative background 58 are dependent upon the diameter of the retroreflectors 56a, 56b and 56c and their corresponding spacing, where the length of the background 58 corresponds to:

Length=(2×spacing)+(3×diameter);

and the width corresponds to:

Width=(2×spacing).

It should be noted, however, that the size and positioning of the retroreflectors 56 is determined by the range at which the passive target vehicle will be tracked. Thus, for long range tracking, larger retroreflectors 56, in addition to a larger background 58 and a greater distance between the retroreflectors 56 is utilized. In contrast, for close range tracking, smaller diameter reflectors and closer positioning is utilized. Ultimately, the size of the target 26 must be such that a minimum target reflection of a retroreflector 56 received by the visual guidance sensor system 12 is 2.5 pixels in width.

Briefly, the improved autonomous rendezvous and docking system 10 operates, as follows. As an initial condition, it is assumed that the relative range and attitude of the two spacecraft to be docked are provided to the system 10 within an acceptable level from some other positional sensor such as a global positioning system (GPS) or ground based tracking (not shown). In particular, the relative range represented in and calculated from the orthogonal coordinates (x, y, z) is within ten percent (10%) accuracy, and the relative off axis attitude (roll, pitch, yaw) is less than thirty (30°) degrees.

The two laser diodes 16 and 18 on the active chase spacecraft 29 illuminates the target 26 on the passive target spacecraft 27. The target 26 consists of the three (3) retroreflectors 56, shown clearly in FIG. 2. The two (2) CCD video cameras 36 and 44 on the chase spacecraft 29 periodically (twice per second) simultaneously capture the laser illuminated image 28 of the target spacecraft and, in particular, of the retroreflectors 56. Optical filters 26b mounted over the retroreflectors 56 and filters 32 and 38 mounted over lenses 34 and 42, respectively result in two (2) video images. The first in band image from camera 36 on line 48 will contain bright reflections from the retroreflectors 56, and the second out of band image from camera 44 on line 50 will not. The two (2) images transmitted over lines 48 and 50 are then digitized in analog to digital (A/D) converters 49 and pointwise unsigned difference in a differencer 51 in the image processing computer 52 to produce a third difference image.

Since both video images are captured concurrently, they should be pixel to pixel identical except for the bright optical reflections from the retroreflectors 56. However, due to laser and solar reflections off other parts of the target spacecraft 27, imperfect optical alignment, and other sources of noise in the system 10, there will always be some clutter in the third difference video image. Therefore, the third difference image is processed further in the image processing computer 52 using a clutter rejection process and a target detection process. These processes filter out spurious reflections to identify the three (3) optical target reflections (called blobs) which correspond to the target 26, specifically the retroreflectors 56. This information is in turn used to determine the relative state between the two (2) spacecrafts, characterized by the six-degrees-of-freedom (6DOF) parameters (x, y, z, roll, pitch, yaw). These parameters give the chase spacecraft 29 relative orientation and range to the target spacecraft 27, which are then provided to the navigation computer 54, via path 53, to perform autonomous navigation and maneuvers.

Figure 3:
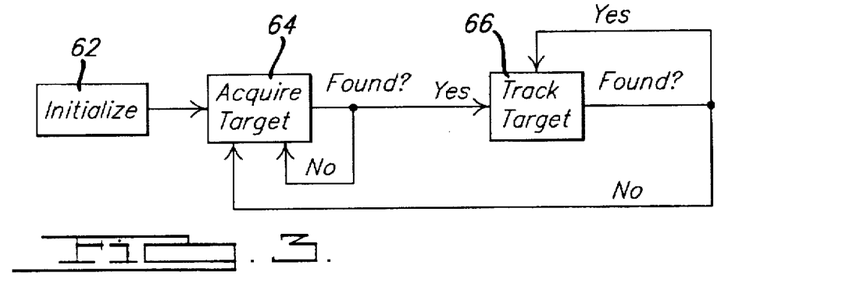
FIG. 3 is a system processing flow chart of the present invention.

Referring to FIG. 3, a top level system 10 processing flow chart of the image processing computer 52, is shown. The first phase of the system 10 processing flow chart starts when an initialization command is sent from the navigation computer 54 to the image processing computer 52, via path 53. The initialization command triggers an initialization module 62. The initialization module 62 sends an initial set of laser intensity and camera shutter speed commands to the video guidance sensor system 12 based on range and the type of diodes 16 and 18 and cameras 36 and 44 used. These commands configure the video guidance sensor system 12 so that the reflections from the target 26 are in the middle of the dynamic range of the CCD cameras 36 and 44. The geometry and size parameters of the target 26, as well as the initial range and attitude of the target spacecraft are also loaded into the image processing computer 52 from the navigation computer 54 via the GPS or ground based tracking. The initial range which comprises the x, y, z parameters has an estimated accuracy of ten (10%) percent and the initial attitude which comprise the roll, pitch and yaw parameters is within thirty (30°) degrees.

After initialization 62 is completed, there are two (2) primary phases to the autonomous rendezvous and docking system 10: acquisition 64 and tracking 66. Both the acquisition phase 64 and tracking phase 66 identify the target 26 in the third difference video image and compute estimates of the six-degrees-of-freedom state vectors, which are then sent to the navigation computer 54, via path 53. The first step after initialization 62 is to acquire 64 the target 26. If the target 26 is not initially acquired 64, the system 10 will continue acquisition 64 until the target 26 is found. Once the target 26 is acquired 64, the target 26 is tracked 66. If during the tracking 66 the target 26 is lost, the system 10 returns to the acquisition phase 64 to reacquire the target 26. Target tracking 66 then continues until a halt signal is received from the navigation computer 54.

Figure 4:
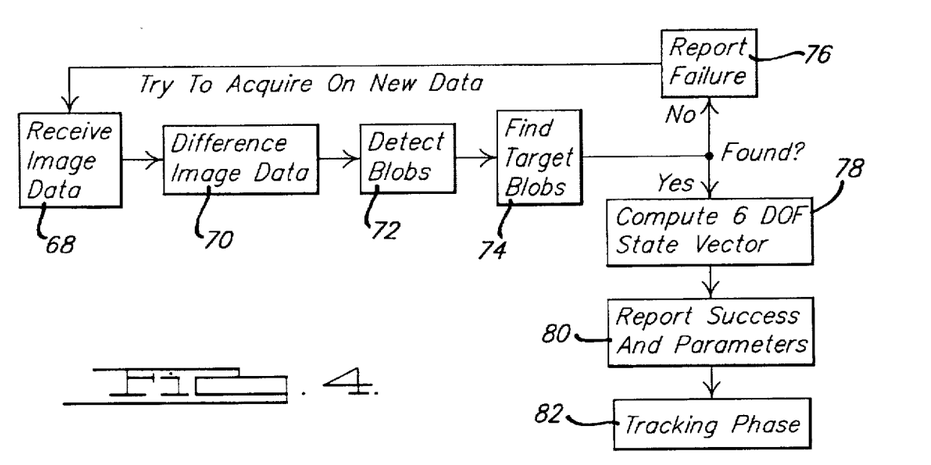
FIG. 4 is an acquisition phase processing flow chart of the present invention.

Turning to FIG. 4, the major components of the acquisition phase 64 are shown. First, the image processing computer 52 receives video image data 68 generated from the two (2) CCD cameras 36 and 44 from lines 48 and 50 preferably every two seconds. That is, video image data frames are captured every two seconds and processed. Next, the image processing computer 52 digitizes the video image data 68 in the A/D converters 49 and generates difference image data 70, via the differencer 51. The difference image data 70 is generated essentially by subtracting the pixel intensity levels from each of the in band and out of band video image data frames 68 generated from both of the CCD cameras 36 and 44. The third step of the acquisition phase 64 segments the entire difference image data 70 into regions of pixels called blobs. This is accomplished by a region growing process, described in detail later, which allows for the detection of blobs 72. Among all of the blobs detected 72, there should be three (3) which correspond to reflections from the three (3) retroreflectors 56 of the target 26. The remaining blobs detected are clutter blobs that come about from spurious reflections off of the target vehicle, misalignment of the video guidance sensor system 12 and other sources of noise inherent in the system 10.

Using a clutter rejection process described in detail later, the fourth step 74 of the acquisition phase 64 searches through all of the detected blobs 72 and determines which three (3) originate from the target 26. Background clutter blobs are eliminated by filters which compare a blob's size, shape and intensity properties with values expected for the target blobs. In addition, the blobs are compared with other blobs to determine if their geometry form a triplet consisting of the target 26. If the three (3) target blobs are not found, a failure signal is sent to the navigation computer 54 in a failure report 76. This failure report 76 causes the image processing computer 52 to reenter the beginning of the acquisition phase 64. Otherwise, a fifth processing step 78 is executed. Using the geometry of the target 26 and the video guidance sensor system 12, the image processing computer 52 deduces the six-degrees-of-freedom state vector parameters (x, y, z, roll, pitch, yaw) at that point in time which quantify the relative offset between the chase spacecraft 29 and the target spacecraft 27. In the sixth and final acquisition step 80, a successful acquisition signal and the six-degrees-of-freedom state vector parameters are sent to the navigation computer 54. After the target 26 has been acquired 64, the system 10 enters the tracking phase 82.

Figure 5:
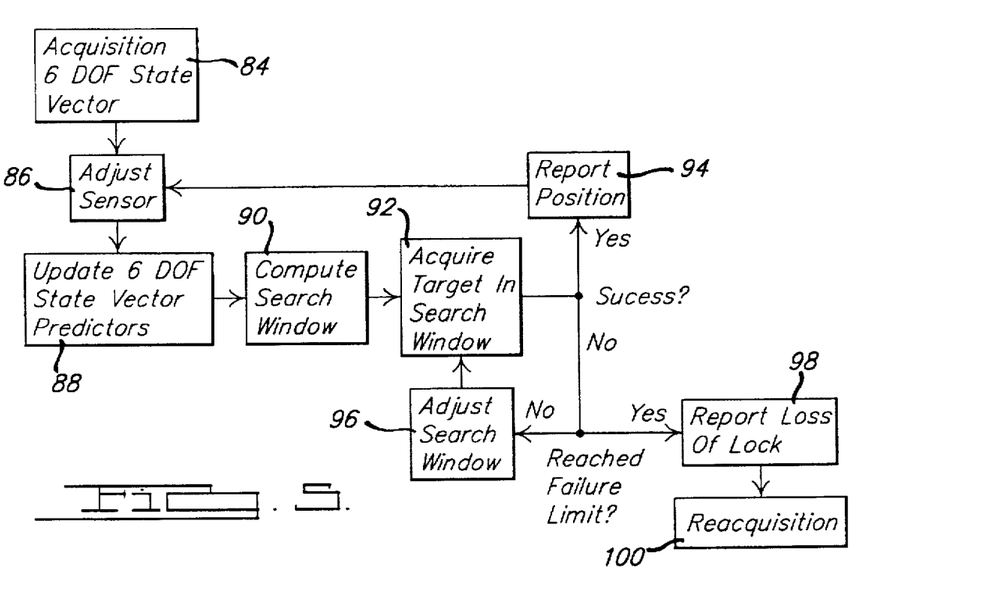
FIG. 5 is a tracking phase processing flow chart of the present invention.

Referring to FIG. 5, the tracking phase 82 processing flow chart, is shown. Step one 84 of the tracking phase 82 begins with the acquisition of the six-degrees-of-freedom state vector outputs from the acquisition phase 64. Once this information is received, the next step 86 is to adjust the lasers 16 and 18 and CCD cameras 36 and 44 based on the six-degrees-of-freedom parameters just acquired. This is done to ensure that the received reflections are within the middle of the dynamic range of the CCD cameras 36 and 44. In the third step 88, the target blob locations in the next frame is predicted and updated by using information about where the target 26 was located in the previous frame times. Next, a smaller search window is computed from this prediction in the fourth processing step 90. This computation restricts the video image region that has to be searched for the target blobs and ultimately reduces the time to acquire the target 26.

In the fifth step 92, processing similar to the acquisition phase 64 is performed on the reduced video data captured within the search window 90. If the target blobs are found, then, as with the acquisition phase 64, state vector parameters (x, y, z, roll, pitch, yaw) are reported 94 to the navigation computer 54. To continue tracking 66, these new parameters are used to again adjust 86 the video guidance sensor system 12. In the event the target 26 is lost while tracking 66, several recovery steps which adjust the search window 96 are attempted. If this is still unsuccessful, then a lost lock command 98 is sent to the navigation computer 54, via path 53. The system 10 then attempts to reacquire 100 the target 26 on the next frame at the beginning of the acquisition phase 64.

Returning to FIG. 4, a more detailed description of the acquisition phase 64 will now be described. As indicated previously, the video image data generated by the CCD cameras 36 and 44 are received 68 by the image processing computer 52 over lines 48 and 50. The first in band and the second out of band video image data frames are then digitized in the A/D converter 49 and differenced 70 in the differencer 51 via an unsigned difference table look-up. By definition, to take the unsigned difference of two (2) values means that if the difference between the values is negative, then that value is replaced with zero (0). Thus, the first in band video image from camera 36 that contains all the reflections, including from the target 26 is subtracted from the second out of band image from camera 44 which does not contain the reflections from target 26. The difference is based on the pixel intensities from each video image. The resulting third difference image data 70 should contain substantially less clutter, as well as the target blobs from the target 26.

Figure 6:
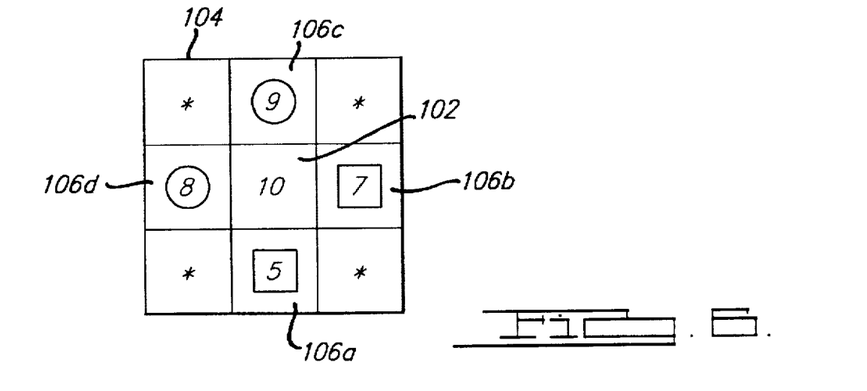
FIG. 6 is a diagram showing how pixels are collected into regions called blobs.

Once the difference image data 70 is generated, the remaining pixels or segments are clustered into the regions called blobs using the region growing process, as set forth in FIG. 6. This region growing process essentially links or clusters adjacent pixels based on their intensity level. An intensity threshold is first set based on range and the type of lasers 16 and 18 and cameras 36 and 44 utilized. If a pixel's intensity is above the intensity threshold, the system 10 checks if any of its four (4) connected neighbor pixels are also above the threshold. If so, then they belong to the same blob. By definition, two (2) pixels are said to be four (4) connected if they abut each other to the north, south, east or west.

For example, the intensity threshold in FIG. 6 is set to eight (8). The pixel 102 centered within the 3×3 pixel neighborhood 104 has an intensity level of ten (10), which is above the threshold level of eight (8). Thus, the adjacent pixels 106 directly to the right, left, top and bottom of the center pixel 102 are checked to determine whether or not they are at or above the intensity threshold level. If the adjacent pixels 106 are at or above this threshold level, then they are considered to originate from the same reflection and are thus added to the region to grow the blob. If the adjacent pixels 106 do not meet the intensity threshold such as pixels 106a and 106b, identified by surrounding squares, then pixels 106a and 106b are not considered part of the blob and thus ignored. The region growing process continues with each adjacent pixel 106c and 106d, identified by surrounding circles, which do meet the intensity threshold level and are thus added to the blob. This region growing process continues until the region or blob ceases to grow, thereby defining the size of the blob.

Figure 7:
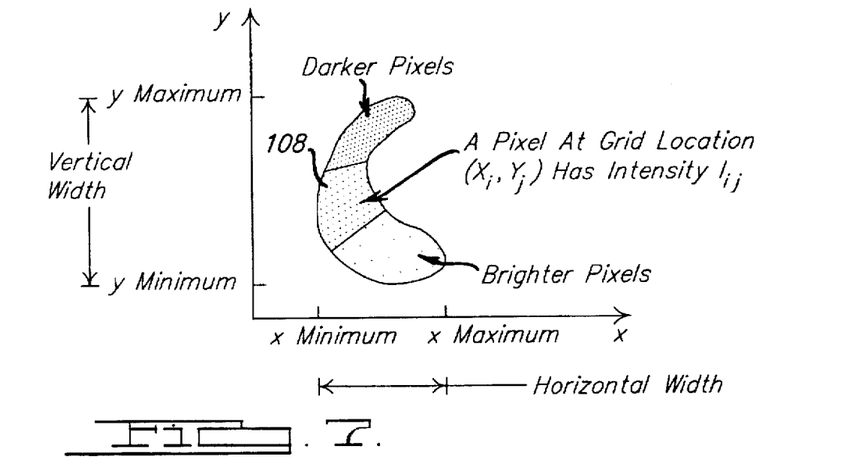
FIG. 7 is a schematic diagram of a typical blob.

Once all of the pixels are grown into blobs so that all of the blobs are detected 72 within the difference image data frame 70, the system 10 then proceeds to find the target blobs 74. Initially, various properties which are used to discriminate target blobs from clutter blobs are computed for each blob. FIG. 7 gives a schematic for a typical blob 108. The blob properties which are computed include the area, extrema (i.e. minimum and maximum two-dimensional focal plane x and y coordinates) and total pixel intensity. The area (Area) is simply the total number of constituted pixels in the blob 108. The extrema is determined by the maximum and minimum linking pixel dimensions in the x and y plane (xMin, xMax, yMin, yMax). The total pixel intensity (Sum I) is determined by:

$$\text{Sum } I = \sum_i I_i;$$

which is the sum of each of the pixel intensities in the blob 108.

Properties used to quantify the shape of each blob 108 are also determined. First intensity moments in the x and y plane (SumIX, Sum IY) are computed for the blob 108 by:

$$\text{sum } IX = \sum_i x_i I_i; \text{ and}$$

$$\text{sum } IY = \sum_j y_j I_j.$$

In addition, first geometric moments (SumX, SumY), second intensity moments (Sum $IX^2$, Sum $IY^2$), and the sum of the moments (Sum IXY) are also determined to later find the center of mass (CM) of the blob 108 by:

$$\text{sum } X = \sum_i x_i;$$

-continued $$\text{sum } Y = \sum_j y_j;$$

$$\text{sum } IX^2 = \sum_i x_i^2 I_i;$$

$$\text{sum } IY^2 = \sum_j y_j^2 I_j; \text{ and}$$

$$\text{sum } IXY = \sum_{i,j} x_i y_j I_{ij}.$$

The above shape and intensity properties of each blob 108 are then used to reject individual clutter blobs or filter the clutter blobs from the target blobs. Since most of the clutter blobs bear no resemblance to the target blobs in size, shape or intensity, this next step eliminates as many individual clutter blobs as possible in upwards of approximately ninety (90%) percent.

The numerous unique properties of a target blob can be determined and the blobs which do not possess these properties are filtered out. Rejection criterion are based on properties that capture size, shape and intensity information about the target blobs based on the estimated distance between the chase vehicle 29 and the target 26. Moreover, since the system 10 is initialized 62 so that the intensity for a fully illuminated pixel corresponding to a target retroreflector 56 is in the middle of the CCD cameras 36 and 44 dynamic ranges, this allows the system 10 to differentiate target blobs from brighter blobs which typically come about from solar glint off of the target vehicle.

Two (2) geometric quantity tests are used to filter single blobs 108. First, since a true target or reflector blob is nearly circular, we compare the ratio of the blob's horizontal and vertical widths by:

$$\text{Ratio} = \frac{\text{Horizontal width}}{\text{Vertical width}}.$$

This horizontal to vertical width ratio should be close to one (1), the ratio for a circle. If not, the blob 108 is rejected. This is a simple first order test to determine the blob's 108 circularity. Second, the geometric centroid of a blob 108 is a way of measuring its center of mass (CM), where every pixel that makes up the blob 108 is counted equally, regardless of its intensity value by:

$$\text{Geometric centroid} = \left( \frac{\text{sumX}}{\text{Area}}, \frac{\text{sumY}}{\text{Area}} \right).$$

On the other hand, the intensity centroid for a blob 108 is the other way of measuring its center of mass (CM) by:

$$\text{IntensityCentroid} = \left( \frac{\text{sumIX}}{\text{SumI}} \right), \left( \frac{\text{sumIY}}{\text{SumI}} \right).$$

In this case, however, the amount of mass given to a pixel depends on how bright it is. For a true reflector blob, the intensity values of its pixels are azimuthally symmetric. Thus, brighter pixels will have a greater mass. These centroid values are derived from the first moment properties previously determined (ie. SumX, SumY, SumIX, SumIY, SumI).

If the intensity values are azimuthally symmetric, then the blob's 108 geometric and intensity centroids should be substantially the same for a target blob That is, the intensity of a target blob should be greatest at its center which will correspond to the geometric center of mass (CM). Accordingly, allowing for some measurement error and pixel discretivation, the relative difference is calculated by:

$$\begin{array}{l}\text{Centroid} \\ \text{distance}\end{array} = \left| \begin{array}{l}\text{geometric} \\ \text{centroid}\end{array} - \begin{array}{l}\text{intensity} \\ \text{centoid}\end{array} \right|$$
:must be << 1;

and should be very small or much less than one (1) to be considered a target blob There are also three (3) size discriminators used to eliminate individual clutter blobs. The size or area of a blob 108 is given by its total number of pixels. The diameter of a target blob will vary as 1/Range. Thus, the size of the target blob may be predicted at any range using known trigonometric properties. The first size discriminator compares the blob 108 area to a range independent minimum. This minimum is determined based on the requirement that each reflection from a retroreflector 56 must be at least 2.5 pixels in width at a maximum range. The second and third size discriminators compares the blob 108 area with a parameterized minimum and maximum area based on the current range of the target 26. If the blobs 108 fail to fall within any of these parameters, they are eliminated as clutter blobs based on these size discriminators.

Next, intensity properties are utilized to compare the blob's total intensity to minima and maxima intensity values also based on the current range of the target 26. A blob's 108 intensity is the sum of the intensity values for all of its contiguous pixels. This intensity is compared to the minimum and maximum to determine if it is within this range. If the blob's 108 intensity is not within this range, it is also eliminated as a clutter blob based on the intensity properties.

The rejection of clutter blobs based on geometry, size and intensity properties typically should eliminate approximately ninety (90%) percent of the clutter blobs. The remaining blobs are then filtered further based on properties of three (3) blobs 108 considered as a unit or triplet 110, as set forth in FIG. 8. First, if there are less than three (3) blobs 108 surviving the single blob filtering step then acquisition is impossible and the failure report 76 is sent to the navigation computer 54 to begin the acquisition phase 64 over again. Otherwise, assuming there are at least three (3) surviving single blobs 108, the system 10 determines if these three (3) blobs 108a, 108b and 108c are the target blobs. As with the single blob filtering, some of the properties used to eliminate false blob triplets are parameterized by range. Moreover, specifications which give bounds on the angular quantities of roll, pitch and yaw are also used.

Figure 8:
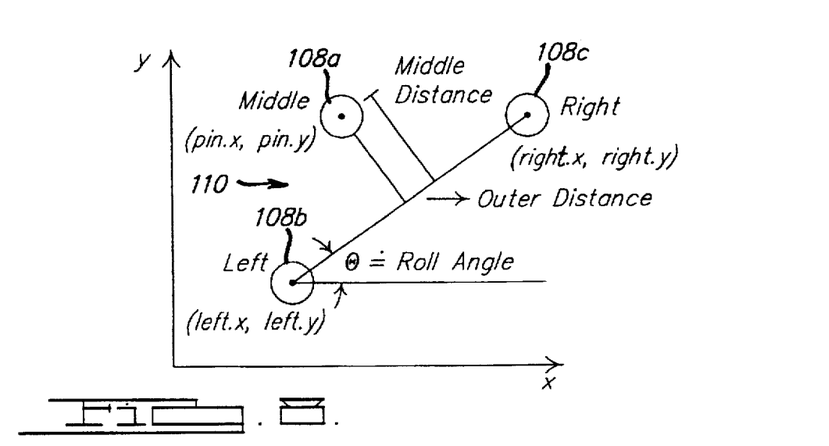
FIG. 8 is a diagram showing the geometric properties of a blob triplet.

Three (3) geometric properties are utilized to reject remaining clutter blobs from the actual target blobs. The first geometric property determines if the outer two (2) blobs 108b and 108c of the blob triplet 110 are too close together or too far apart. If so, then the triplet 110 cannot correspond to the target blobs, regardless of its orientation. The allowed values are parameterized by the range of the target 26 and the maximum allowed yaw angle. Similarly, the distance between the center blob 108a and the outer blobs 108b and 108c cannot be greater than a value which depends on the range and the maximum allowed roll, pitch and yaw (i.e. 30°). Finally, since the maximum roll angle allowed is known, some candidate triplets 110 can be eliminated by simply checking and determining this angle. These geometric properties are determined using known trigonometric properties.

Once the blob triplets are filtered using geometric information, the blob triplets are then further filtered using area and intensity properties. First, there are two (2) relative area tests performed. The first test considers that since the outer reflectors 56b and 56c are approximately the same distance from the cameras focal planes, their focal plane areas will also be similar. Hence, the ratio of the areas of the outer two (2) blobs 108b and 108c are examined by:

$$\frac{(Area_{left})}{(Area_{middle})}, \frac{(Area_{left})}{(Area_{right})};$$

to determine if they are within an acceptable interval such as (0.9,1.0). Next, since it is assumed that the middle reflector 56b is always closer to the focal plane than the outer reflectors 56a and 56c, its image size should be at least as large as the outer reflectors 56b and 56c. This constrains the ratio of the area of each outer blob 108b and 108c to the area of the center blob 108a by:

$$Min\left(\frac{(Area_{right})}{(Area_{middle})}, \frac{(Area_{left})}{(Area_{right})}\right).$$

As above, these ratios should be within an acceptable interval such as (0.9,1.0).

Once the area tests are performed, then the intensity properties are exploited. Specifically, since the center reflector 56a is closer to the cameras focal planes than the outer two (2) reflectors 56b and 56c, its corresponding center blob 108a will be at least as bright as the outer reflector blobs 108b and 108c. Additionally, since the outer two (2) blobs 108b and 108c are approximately the same distance from the cameras focal planes, their intensity ratios should be approximately one (1) for the blob triplet 110 to be considered the target blobs.

Figure 9:
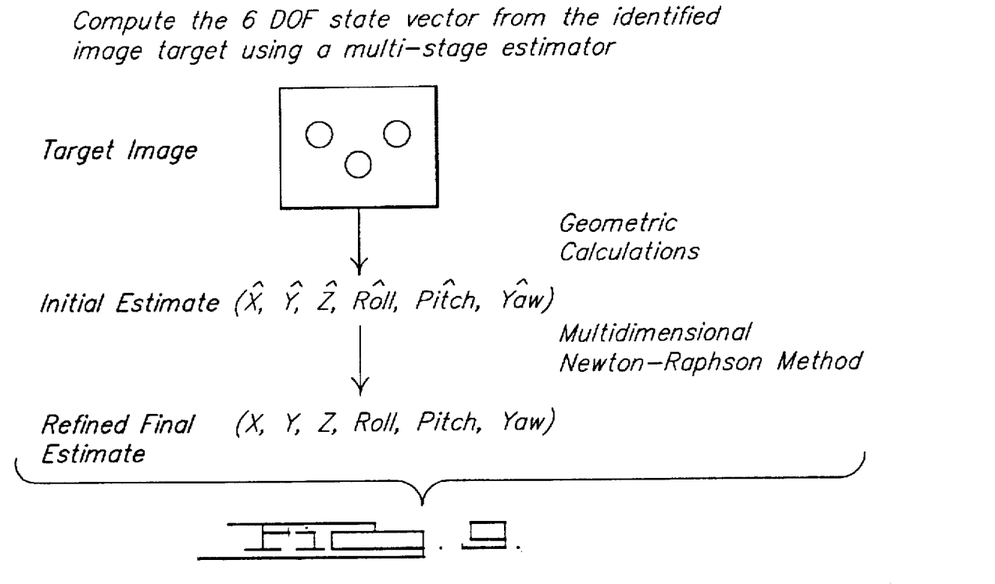
FIG. 9 is a diagram showing how the six degrees of freedom parameters are determined.

Once the blob triplet 110 corresponding to the target blobs has been identified, their intensity centroids previously computed in FIG. 8 are used to determine and compute the six-degrees-of-freedom parameters (x, y, z, roll, pitch, yaw). FIG. 9 provides an overview of a multi-stage estimator process which is used to compute the six-degrees-of-freedom state vectors 78.

First, initial estimates for the six-degrees-of-freedom parameters referenced to the base 61 of the pin 60 are calculated. These initial values are derived from first order approximations using the known geometry of the target 26, the optical transfer function of the system 10, and the focal plane intensity centroid locations of the three blobs 108. The known geometry of the target 26 and the optical transfer function also yield three nonlinear equations with three (3) unknowns for the true Z spatial coordinates of the target 26 reflectors 56. Using the initial estimates as a starting points this system of equations is solved numerically by a multi-dimensional Newton-Raphson method. This solution in turn is used to derive the entire six-dimensional state vector (x, y, z, rolls pitch, yaw).

The six-degrees-of-freedom state vectors are specifically determined as follows. Referring to FIG. 9, the inputs used to compute the six-degrees-of-freedom state vectors consist of the height of pin 60 (PINHEIGHT) connected to the center retroreflector 56a, the base length (BASE) consisting of the distance between the center of the left and right retroreflectors 56b and 56c, and the focal length (FocalLength) for the cameras 36 and 44. These initial parameters are entered during initialization 62 of the system 10.

With these initial parameters known, the pin distances are computed vectorally utilizing the formulas set forth below. The inputs to these formulas consist of the above parameters and estimates of the x and y coordinates of the reflected blobs derived from the intensity centroids previously calculated. These x and y coordinates are set forth and labelled in FIG. 8.

$$\Delta B_x = right.x - left.x;$$

$$\Delta B_y = right.y - left.y;$$

$$\Delta P_x = pin.x - left.x;$$

$$\Delta P_y = pin.y - left.y;$$

$$base = \sqrt{\Delta B_x^2 + \Delta B_y^2};$$

$$d_x = \frac{(\Delta B_X \times \Delta P_X) + (\Delta B_Y \times \Delta P_Y)}{base} - (0.5 \times base); \text{ and}$$

$$d_y = \frac{(\Delta B_X \times \Delta P_Y) + (\Delta B_Y \times \Delta P_X)}{base}.$$

Utilizing the above equations in addition to the BASE and FocalLength parameters, the initial estimate of Z is determined by:

$$zcE = \frac{(BASE \times FocalLength)}{base}.$$

The initial estimate for the pitch is determined by:

$$correction_1 = \frac{(pin.y \times \Delta B_x) - (pin.x \times \Delta B_y)}{base}; \text{ and}$$

$$pitch\ E = acrsin\left[\frac{(dy \times zcE) - (correction_1 \times PINHEIGHT)}{(FocalLength \times PINHEIGHT)}\right]$$

The initial estimate for yaw is determined by:

$$correction_2 = \frac{(pin.x \times \Delta B_x) + (pin.y \times \Delta B_y)}{base};$$

$$yaw\ E = acrsin\left[\frac{(dx \times zcE) - (correction_2 \times PINHEIGHT)}{(FocalLength \times PINHEIGHT \times cos(pitch\ E))}\right]$$

The initial estimate for roll is determined by:

$$correction_3 = 0.5 \times BASE \times sin(yaw\ E);$$

$$zLeft = zcE - correction_3;$$

$$zRight = zcE + correction_3; \text{ and}$$

$$roll\ E = acrtan\left[\frac{(right.y \times zRight) - (left.y \times zLeft)}{(right.x \times zRight) - (left.x \times zLeft)}\right]$$

Once the above computations have been performed, the initial estimates for x, y, z, roll, pitch, yaw are finally determined as follows:

$$zc = zcE;$$

$$factor = \frac{0.1}{FocalLength};$$

$$xc = factor \times \left[\frac{(zLeft \times left.y) + (zRight \times right.x)}{2.0}\right];$$

$$yc = factor \times \left[\frac{(zLeft \times left.x) + (zRight \times right.y)}{2.0}\right];$$

$$yaw = yawE;$$

-continued pitch = pitchE; and roll = rollE.

After the initial estimates for the six-degrees-of-freedom parameters (x, y, z, roll, pitch, yaw) have been determined, as shown in FIG. 9, the next step is to compute the refined final value for these parameters utilizing the multidimensional Newton-Raphson method. First, an initial estimate of the spatial Z coordinates of the three (3) reflectors 56a, 56b and 56c is determined. The initial estimates of the six-degrees-of-freedom parameters are used in addition to the following equations to compute the initial estimate of the spatial Z coordinates of the reflectors 56:

$$hbase = \frac{BASE}{2.0} \; ;$$

sinpitch = sin(pitch);

sinyaw = sin(yaw);

$zLEFT = zc - (hbase \times sinyaw)$;

$zRIGHT = zc + (hbase \times sinyaw)$; and $zPIN_1 = zc - [(PINHEIGHT) \times \sqrt{1-(sinpitch)^2} \times \sqrt{1-(sinyaw)^2} \;]$.

The initial estimate of the spatial Z coordinates of the reflectors 56 equal $zLEFT_1$, $zRIGHT_1$ and $zPIN_1$ corresponding to the equations set forth above. Once the spatial Z coordinates of the three (3) reflectors 56 are computed, these initial estimates are refined for a more accurate estimate of the Z coordinates of the reflectors 56 using a system of three (3) equations with three (3) unknown Z coordinates. Then by using the multidimensional Newton-Raphson numerical method for solving a system of equations given an initial estimated a more accurate determination of what the true Z coordinates must be, are determined. To compute the more accurate estimate of the Z coordinates of the reflectors 56, the following equations are used:

$$v11 = \frac{left.x}{FocalLength} \; ;$$

$$v12 = \frac{left.y}{FocalLength} \; ;$$

$$v21 = \frac{right.x}{FocalLength} \; ;$$

$$v22 = \frac{right.y}{FocalLength} \; ;$$

$$v31 = \frac{pin.x}{FocalLength} \; ;$$

$$v32 = \frac{pin.y}{FocalLength} \; ;$$

$a1 = (v11)^2 + (v12)^2 + 1$;

$a2 = (v21)^2 + (v22)^2 + 1$;

$a3 = (v31)^2 + (v32)^2 + 1$;

$b1 = (v11 \times v21) + (v12 \times v22) + 1$;

$b2 = (v11 \times v31) + (v12 \times v32) + 1$;

$b3 = (v21 \times v31) + (v22 \times v32) + 1$;

$BaseSqr = BASE^2$; and

-continued $$SideSqr = \frac{BaseSqr}{4.0 + PINHEIGHT^2} \; .$$

Let $z = (z_1, z_2, z_3) = (zLEFT_1, zRIGHT_1, zPIN_1)$ so:

$z1Sqr = z_1^2$;

$z2Sqr = z_2^2$; and $z3Sqr = z_3^2$.

Then the three equations in the three unknowns are:

$f1(z) = (a1 \times z1Sqr) - (2 \times b1 \times z1 \times z2) + (a2 \times z2Sqr) - (BaseSqr)$;

$f2(z) = (a1 \times z1Sqr) - (2 \times b2 \times z1 \times z3) + (a3 \times z3Sqr) - (SideSqr)$; and $f3(z) = (a2 \times z2Sqr) - (2 \times b3 \times z2 \times z3) + (a3 \times z3Sqr) - (SideSqr)$.

Set $F(z) = (f1(z), f2(z), f3(z))$.

Then by the standard multidimensional Newton-Raphson method, with the initial estimate $zInit = (zLEFT_1, zRIGHT_1, zPIN_1)$, solve the vector equation $F(z) = 0$.

Once the Newton-Raphson method is performed to refine the estimates of the Z coordinates, the refined state vector estimate is computed in terms of the refined Z coordinates $zFinal = (zLEFT_F, zRIGHT_F, zPIN_F)$ produced by the Newton-Raphson method, as shown above. The refined final estimate for the six-degrees-of-freedom parameters (x, y, z, roll, pitch, yaw) is referenced from the base 61 of pin 60 and computed as follows:

First, calculate the yaw by:

$$sinyaw = \frac{(zRIGHT_F - zLEFT_F)}{BASE} \; ; and$$

yaw = arcsin(sinyaw).

Next, calculate the roll by:

$$temp = \frac{(right.y \times zRIGHT_F) - (left.y \times zLEFT_F)}{(right.x \times zRIGHT_F) - (left.x \times zLEFT_F)} \; ; and$$

roll = acrtan(temp).

Next, compute (x,y,z) coordinates from the base 61 of pin 60 by finding midpoint for left and right points by:

1) First, normalize the z-values by:

$zLeftN = zLEFT_F/FocalLength$;

$zRightN = zRIGHT_F/FocalLength$; and $zPinN = zPIN_F/FocalLength$.

2) Compute spatial x and y for the pin reflection by:

$xpin = pin.x \times zPinN$;

$ypin = pin.y \times zPinN$;

$xc = (0.5) \times ((left.x \times zLeftN) + (right.x \times zRightN))$;

$yc = (0.5) \times ((left.y \times zLeftN) + (right.y \times zRightN))$; and $zc = (0.5) \times (zLEFT_F + zRIGHT_F)$.

Next, compute y values in rotated coordinate system by:

$ypintilde = (-sin\,(roll) \times xpin) + (cos\,(roll) \times ypin)$; and $yctilde = (-sin\,(roll) \times xc) + (cos\,(roll) \times yc)$.

Finally, calculate the pitch by:

$$\text{sinpitch} = \frac{(\text{ypintilde} - \text{yctilde})}{\text{PINHEIGHT}} \; ; \text{and}$$

pitch = acrsin(sinpitch).

Thereafter, once the six-degrees-of-freedom state vectors are finally calculated 78, the report 80 of the parameters is provided to the navigation computer 54. The navigation computer 54 receives these parameters and the tracking phase 82 begins.

Returning to FIG. 5, a more detailed description of the tracking phase 82 processing flow chart will now be described. The tracking phase 82 is entered once the target 26 has been acquired in the acquisition phase 64 set forth above. The tracking phase 82 initial input 84 is the output six-degrees-of-freedom state vectors computed in the acquisition phase 64, as set forth above. Once these parameters are entered, the first step in the tracking phase 82 loop is to adjust 86 the laser's 16 and 18 intensities and the camera's 36 and 44 shutter speeds based on the six-degrees-of-freedom parameters inputed. Adjustments are made so that the intensity of the target blobs will be in the middle of the dynamic range of the CCD cameras 36 and 44. This allows the system 10 to eliminate bright blobs that come off from solar specular glint of the target spacecraft 27.

Figure 10:
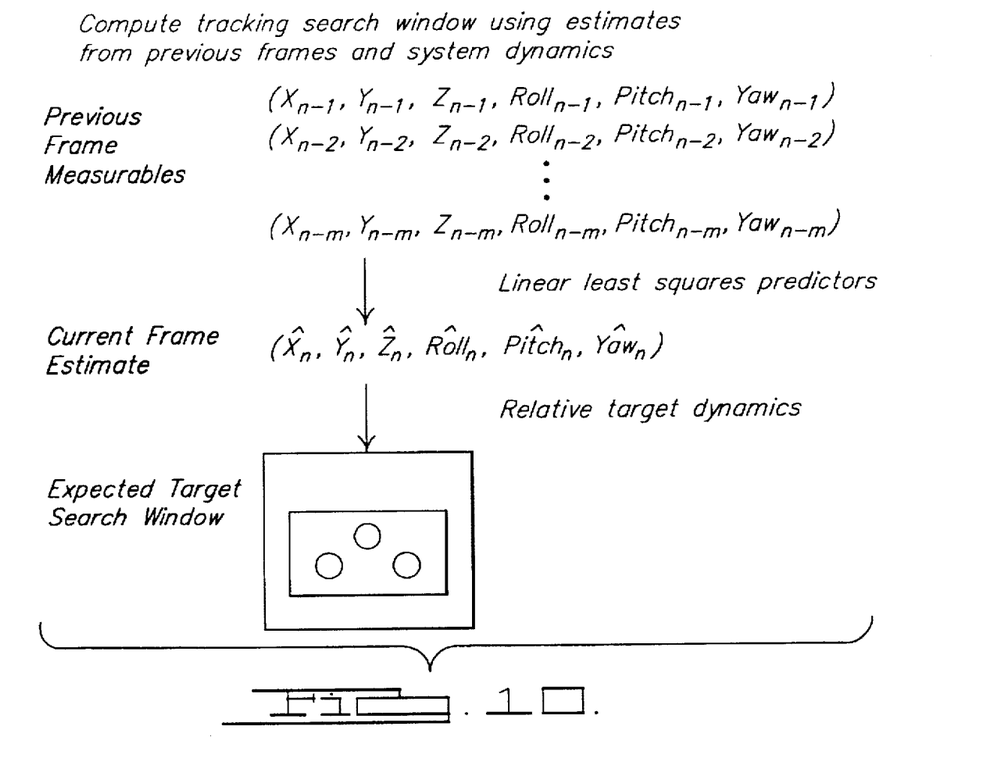
FIG. 10 is a diagram showing how a tracking search window is determined.

The next step is to update the six-degrees-of-freedom state vector predictors 88, as shown in FIG. 10, for all subsequent video data frames. A set of linear least squares predictors are used as known in the art to compute the estimates for each of the six-degrees-of-freedom parameters. These predictors use values from up to an adjustable number of previous frames. By using data over a number of previous measurements, any egregious errors coming from one frame estimate can be smoothed out. This provides a current frame estimate for the six-degrees-of-freedom parameters. From this estimate, an expected target search window is computed 90 which should contain the target blobs. This estimate is combined with available information about the system dynamics (i.e. velocity of chase spacecraft 29 to target spacecraft 27) which narrows the region where the target blobs can be found, as shown in FIG. 10.

Once the window has been computed 90, the next step in the tracking phase 82 is to find or acquire the target 92 in the window. In essence, this reduces to entering the acquisition phase 64 with a reduced video dataset. Only the video image data contained in the window needs to be differenced. Blob detection and clutter rejection is run on the differenced data. Processing the video data in the window saves substantial computational expense, since image differencing 70 and blob detection 72 are by far the most computationally tasking modules in the system 10.

Since the predictors provide enough information to substantially narrow the filtering parameters, the individual clutter blobs and target blobs are filtered more efficiently than is possible in the normal acquisition phase 64. The blobs 108 that survive individual filtering are imputed into the same blob triplet filtering module used in the acquisition phase 64. The state vector computational module 78 and the reporting parameter 80 are also identical in the tracking phase 82.

Figure 11:
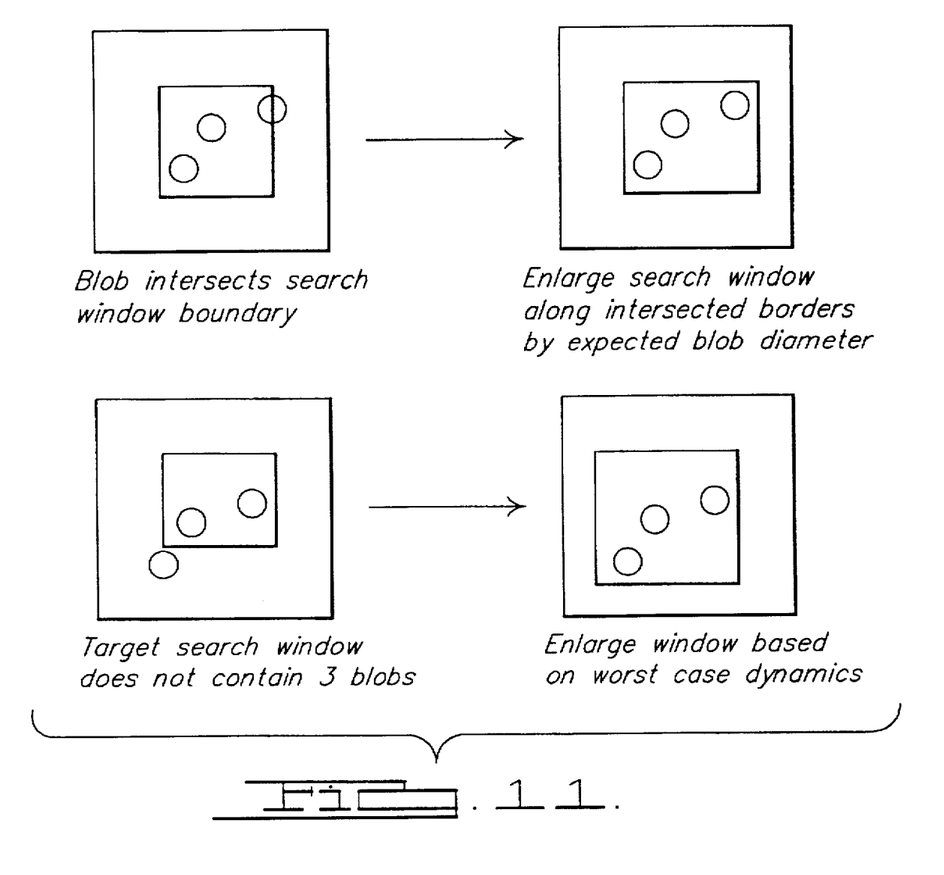
FIG. 11 is a diagram showing how the tracking search window is enlarged and modified.

If the target 26 is not found in the window initially computed 90, the tracking phase 82 goes through several stages to recover the target 26. These stages are shown clearly in FIG. 11. In the event that a blob pixel intersects the boundary of a window, it is enlarged along the appropriate borders by the estimated blob sizes. More generally, if the target 26 is not found in the window, then progressively larger windows are selected. The window sizes are based on worst case relative dynamics. The allowable number of enlargements is adjustable. For example, a maximum of four (4) enlargements of the window is typically attempted. If this still fails to capture the target blobs, the target 26 has been lost, so a report of loss of lock 98 is sent to the navigation computer 54. The system 10 then reenters the acquisition phase 64 during the next image frame. If the target 26 is found, the number of times a subwindow had to be enlarged determines the confidence level for the reported six-degrees-of-freedom state vector parameters.

The foregoing discussion discloses and describes merely exemplary embodiments of the present invention. One skilled in the art would readily recognize from such discussion, and from the accompanying drawings and claims, that various changes, modifications and variations can be made therein without departing from the spirit and scope of this invention as defined by the following claims.

What is claimed is:

1. An autonomous rendezvous and docking system, said system comprising:

a reflective target responsive to radiation of a first wavelength, said reflective target having a known geometry and size;

sensor means for transmitting and receiving radiation of the first wavelength and of a second wavelength, said sensor means operable to illuminate the reflective target and receive reflected radiation, said sensor means further operable to convert the reflected radiation into a first image and a second image corresponding to the first and second wavelengths;

difference means for subtracting the first image from the second image based on intensity of the reflected radiation to produce a third image via a pointwise unsigned difference, wherein if the difference between an intensity value in the first image and an intensity value in the second image is a negative value, then the negative value is replaced with zero (0), said third image including target reflective images from the reflective target and spurious reflective images; and acquisition means for identifying the target reflective images and for determining a current relative position of the reflective target, said acquisition means including region growing means for growing target regions and spurious regions by grouping a plurality of adjacent pixels comprising the target reflective images and the spurious reflective images, and detection means for identifying the target regions from the spurious regions based on the known geometry and size of the reflective target and on intensity, size, shape and location of the target regions and the spurious regions, said detection means includes means for determining a ratio of horizontal width to vertical width of each region, wherein if the ratio is not substantially one (1), then the region is eliminated as a spurious region based upon knowing the geometry and size of the reflective target.

2. The autonomous rendezvous and docking system as defined in claim 1 wherein said reflective target includes three retroreflectors and a cooperative background.

3. The autonomous rendezvous and docking system as defined in claim 2 wherein said three retroreflectors include a center retroreflector positioned on a first plane above a right retroreflector positioned on a second plane and a left retroreflector positioned on the second plane.

4. The autonomous rendezvous and docking system as defined in claim 1 wherein said sensor means includes a first laser diode for transmitting the radiation of the first wavelength and a second laser diode for transmitting the radiation of the second wavelength, a first charge coupled device camera for receiving radiation of the first wavelength and a second charge coupled device camera for receiving radiation of the second wavelength.

5. The autonomous rendezvous and docking system as defined in claim 1 wherein said acquisition means further includes:

vector means for determining the current relative position of the reflective target from the identified target regions.

6. The autonomous rendezvous and docking system as defined in claim 1 wherein said region growing means grows the regions by grouping pixels with other adjacent pixels positioned directly to the right, left, top and bottom of the pixels based on the intensity of the pixels.

7. The autonomous rendezvous and docking system as defined in claim 6 wherein if a first pixel is at or above an intensity threshold, then the adjacent pixels positioned directly to the right, left, top and bottom of the first pixel that are also at or above the intensity threshold are grouped with the first pixel to form a region.

8. The autonomous rendezvous and docking system as defined in claim 1 wherein said detection means further includes:

means for determining the area of each region;

means for determining the x and y extrema of each region; and means for determining total pixel intensity of each region.

9. The autonomous rendezvous and docking system as defined in claim 8 wherein said detection means further includes:

means for determining if the area of the region is within a minimum and maximum area estimate based on the range of the reflective target; and means for determining if the total intensity of a region is within a minimum and maximum intensity estimate based on the range of the reflective target, wherein if the region is not within the minimum and maximum area estimate or the minimum and maximum intensity estimate, then the region is eliminated as a spurious region.

10. The autonomous rendezvous and docking system as defined in claim 1 wherein said detection means further includes:

means for determining the geometric centroid of each region;

means for determining the intensity centroid of each region; and means for subtracting the geometric centroid from the intensity centroid of each region, wherein if the geometric centroid subtracted from the intensity centroid is not substantially less than one (1), then the region is eliminated as a spurious region.

11. The autonomous rendezvous and docking system as defined in claim 1 wherein said detection means further includes means for determining the width of each region, wherein if the width of a region is less than 2.5 pixels, then the region is eliminated as a spurious region.

12. The autonomous rendezvous and docking system as defined in claim 1 wherein the detection means further includes triplet region filtering means for filtering triplet regions, said triplet regions including three regions, said triplet filtering means filters the triplet regions based on geometry, area and intensity of the regions to determine if the triplet regions are the target regions.

13. The autonomous rendezvous and docking system as defined in claim 5 wherein said vector means determines the current x, y, z, roll, pitch and yaw positions of the reflective target.

14. The autonomous rendezvous and docking system as defined in claim 13 wherein said vector means includes an initial estimate means for determining an initial estimate of the x, y, z, roll, pitch and yaw positions of the reflective target based on the geometry of the reflective target, intensity centroids of the target regions and focal length of the sensor means.

15. The autonomous rendezvous and docking system as defined in claim 14 wherein said vector means determines the position of the reflective target utilizing the initial estimate and a multidimensional Newton-Raphson method.

16. The autonomous rendezvous and docking system as defined in claim 5 wherein said system further comprises:

tracking means for tracking the reflective target once the vector means determines the current position of the reflective target.

17. The autonomous rendezvous and docking system as defined in claim 16 wherein said tracking means adjusts the sensor means based on the current position of the reflective target so that the sensor means is in the middle of its dynamic range.

18. The autonomous rendezvous and docking system as defined in claim 16 wherein said tracking means includes window means for determining a current search window where the target regions are located based on previous positions of the reflective target.

19. The autonomous rendezvous and docking system as defined in claim 1 wherein said reflective target is positioned on a target vehicle.

20. The autonomous rendezvous and docking system as defined in claim 1 wherein said sensor means, difference means and acquisition means are positioned on a tracking vehicle.

21. An autonomous rendezvous and docking system, said system comprising:

a reflective target positioned on a target spacecraft and having a known geometry and size;

sensor means for transmitting and receiving radiation, said sensor means operable to illuminate the reflective target and receive reflected radiation, said sensor means positioned on a tracking spacecraft;

difference means for subtracting the first image from the second image based on intensity of the reflected radiation to produce a third image via a pointwise unsigned difference, wherein if the difference between an intensity value in the first image and an intensity value in the second image is a negative value, then the negative value is replaced with zero (0), said third image including target reflective images from the reflective target and spurious reflective images, said images comprising a plurality of pixels, said difference means positioned on the tracking spacecraft;

region growing means for growing target regions and spurious regions by grouping adjacent pixels, said region growing means positioned on the target spacecraft;

detection means for identifying the target regions from the spurious regions based on the known geometry and size of the reflective target and on intensity, size, shape and location of the target regions and the spurious regions, said detection means positioned on the tracking spacecraft, said detection means includes means for determining a ratio of horizontal width to vertical width of each region, wherein if the ratio is not substantially one (1), then the region is eliminated as a spurious region based on knowing the geometry and size of the reflective target; and vector means for determining a current relative position of the reflective target from the identified target regions based on knowing the geometry and size of the reflective target, said vector means positioned on the tracking spacecraft.

22. An autonomous rendezvous and docking system, said system comprising:

a reflective target including three retroreflectors each having a known geometry and size;

sensor means for transmitting and receiving radiation, said sensor means operable to illuminate the reflective target and receive reflected radiation;

difference means for subtracting a first image from a second image based on intensity of the reflected radiation in the first image and the second image to produce a third image via a pointwise unsigned difference, wherein if the difference between an intensity value in the first image and an intensity value in the second image is a negative value, then the negative value is replaced with zero (0), said third image including target reflective images from the reflective target and spurious reflective images, said images comprising a plurality of pixels;

region growing means for growing target regions and spurious regions by grouping adjacent pixels based on the intensity of the pixels;

detection means for identifying the target regions from the spurious regions based on the known geometry and size of the reflective target and on intensity, size, shape and location of the target regions and the spurious regions, said detection means includes means for determining the geometric centroid of each region, means for determining the intensity centroid of each region, and means for subtracting the geometric centroid from the intensity centroid of each region, wherein if the geometric centroid subtracted from the intensity centroid is not substantially less than one (1), then the region is eliminated as a spurious region;

vector means for determining a current position of the reflective target from the identified target regions, said vector means determining the x, y, z, roll, pitch and yaw positions of the reflective target based on the known geometry and size of the reflective target; and tracking means for tracking the reflective target once the vector means determines the current position of the reflective target based on the known geometry and size of the reflective target.

23. A method for autonomous rendezvous and docking, said method comprising the steps of:

providing a reflective target having a known geometry and size responsive to radiation of a first wavelength;

illuminating the reflective target with radiation of the first wavelength and of a second wavelength to generate a first image and a second image corresponding to the first and second wavelengths based on reflected radiation;

subtracting the first image from the second image based on intensity of the reflected radiation to produce a third image via a pointwise unsigned difference, wherein if the difference between an intensity value in the first image and an intensity value in the second image is a negative value, then the negative value is replaced with zero (0), said third image including target reflections from the reflective target and spurious reflections, said reflections comprising a plurality of pixels;

grouping the pixels into target regions and spurious regions;

identifying the target regions from the spurious regions based on the known geometry and size of the reflective target and on intensity, size, shape and location of the target regions and the spurious regions; and determining the relative position of the reflective target from the identified target regions based on the known geometry and size of the reflective target.

24. The method as defined in claim 23 wherein the step of determining the relative position of the reflective target from the identified target regions includes the step of determining x, y, z, roll, pitch and yaw positions of the reflective target.

25. The method as defined in claim 23 further comprising the step of tracking the reflective target based on the current position of the reflective target.

26. The method as defined in claim 25 wherein the step of tracking the reflective target further includes the step of determining a search window based on previous positions of the reflective target.

27. The method as defined in claim 26 wherein the step of determining the search window further includes the step of adjusting the size of the search window if the target regions are not within the search window.

28. The method as defined in claim 23 wherein the step of providing a reflective target includes the step of providing three (3) retroreflectors and a cooperative background.

29. The method as defined in claim 23 wherein the step of grouping the pixels into target regions and spurious regions includes the step of:

determining if a first pixel is at or above an intensity threshold, wherein if the first pixel is at or above the intensity threshold, then the adjacent pixels positioned directly to the right, left, top and bottom of the first pixel that are also at or above the intensity threshold are grouped with the first pixel to form a region.

30. The method as defined in claim 23 wherein the step of identifying the target regions from the spurious regions includes the steps of:

determining the area of each region;

determining the x and y extrema of each region;

determining total pixel intensity of each region;

determining a ratio of horizontal width to vertical width of each region;

determining the geometric centroid of each region;

determining the intensity centroid of each region; and determining if the width of each region is less than 2.5 pixels.

31. The method as defined in claim 24 wherein the step of determining the position of the reflective target includes the steps of:

determining an initial estimate of the x, y, z, roll, pitch and yaw positions of the reflective target based on the geometry of the reflective target and the intensity centroid of the target regions; and determining the position of the reflective target utilizing the initial estimate and a multidimensional Newton-Raphson method.

* * * * *